US012726750B2

(12) United States Patent
Sano

(10) Patent No.: US 12,726,750 B2
(45) Date of Patent: Sep. 1, 2026

(54) MICROPHONE WINDSCREEN AND MICROPHONE DEVICE

(71) Applicant: Audio-Technica Corporation, Tokyo (JP)

(72) Inventor: Yusuke Sano, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 211 days.

(21) Appl. No.: 18/702,012

(22) PCT Filed: May 30, 2022

(86) PCT No.: PCT/JP2022/021892
§ 371 (c)(1),
(2) Date: Apr. 17, 2024

(87) PCT Pub. No.: WO2023/074034
PCT Pub. Date: May 4, 2023

(65) Prior Publication Data
US 2024/0414464 A1 Dec. 12, 2024

(30) Foreign Application Priority Data
Oct. 29, 2021 (JP) ................................ 2021-177776

(51) Int. Cl.
*H04R 1/08* (2006.01)

(52) U.S. Cl.
CPC ......... *H04R 1/086* (2013.01); *H04R 2410/07* (2013.01)

(58) Field of Classification Search
CPC ....... H04R 1/086; H04R 1/08; H04R 2410/07
See application file for complete search history.

(56) References Cited

U.S. PATENT DOCUMENTS

2021/0245675 A1 8/2021 Yoshino

FOREIGN PATENT DOCUMENTS

| | | | |
|---|---|---|---|
| JP | S53-079028 | U | 7/1978 |
| JP | 63-165995 | U | 10/1988 |
| JP | 2005184315 | A | 7/2005 |
| JP | 2005-347984 | A | 12/2005 |
| JP | 2006-060479 | A | 3/2006 |
| JP | 2010-246069 | A | 10/2010 |
| JP | 2012-175379 | A | 9/2012 |

*Primary Examiner* — Tuan D Nguyen
(74) *Attorney, Agent, or Firm* — WCF IP

(57) ABSTRACT

To facilitate attaching and detaching a windscreen to and from a microphone and prevent the windscreen from dropping off from the microphone. The microphone windscreen 20 includes a windscreen body 21 detachably attached to the microphone 10 and an attachment/detachment member coupled to the windscreen body. The windscreen body includes an insertion cavity 211*h* where the microphone is accommodated. The attachment/detachment member includes an insertion hole 223*h* through which the microphone accommodated in the cavity is placed and a claw portion 224 being bendable and disposed at the hole. The claw portion is located at a steady-state position without bending before the microphone is inserted through the hole toward the cavity, the claw portion is bent toward the cavity by the microphone during the microphone being inserted through the hole into the cavity, and the claw portion returns to the steady-state position after the microphone is accommodated in the cavity.

6 Claims, 9 Drawing Sheets

MICROPHONE WINDSCREEN AND MICROPHONE DEVICE

FIELD OF THE INVENTION

The present invention relates to a microphone windscreen and a microphone device.

BACKGROUND

When wind hits a microphone in an environment where the microphone is used, wind noise caused by the wind and the like may be included in an output from the microphone. A windscreen (a protection against wind) covering over the microphone is attached to the microphone in order to prevent such wind noise (for example, see PTL 1).

[PTL 1] JP2005-347984 A

The windscreen is made of a porous elastic material such as polyurethane, for example, and is directly covered over the microphone. The windscreen includes a non-through insertion cavity at one end (at lower end) in which the microphone is accommodated. An inner diameter of the insertion cavity is smaller than an outer diameter of the microphone. Thus, the windscreen is attached to the microphone with the insertion cavity expanded to be larger than a diameter of the microphone. In this state, the insertion cavity tightens the microphone due to the elastic force of the windscreen. As a result, the windscreen is fixed to the microphone by the tightening force with respect to the microphone and a frictional force generated between the microphone and the windscreen (hereinafter collectively referred to as "holding force"). In this way, the microphone is covered with the windscreen, thereby preventing wind noise from occurring.

The microphone to which the windscreen is attached includes a small microphone such as a lavalier microphone and a gun microphone, for example. These microphones are used in a wide range of applications such as voice recording during video shooting, voice calls, and lecture meetings. In particular, the lavalier microphone is worn on a speaker (a human body) in a TV program, a lecture meeting, and the like.

In recent years, a microphone to which the windscreen is attached (e.g., lavalier microphone) has been widely used, for example, in a match venue of sports (e.g., curling and volleyball), which is broadcast on television. That is, for example, microphones are worn on curling players and pick up a conversation of the players during time-out of a game, sighs and breathing of the players, and the like. Another example is that a microphone is attached to a net for volleyball and picks up sounds such as a sound for a player hitting a ball and a sound for a player blocking the ball. As a result, TV viewers can enjoy watching sports while feeling presence and high tension by players' voices and sounds generated in a game.

As described above, the conventional windscreen is fixed to a microphone due to the holding force with respect to the microphone. However, the holding force of the windscreen with respect to the microphone decreases due to aged deterioration of the windscreen, for example. The windscreen with the reduced holding force for the microphone is more likely to drop off (fall) from the microphone.

However, when the windscreen drops off from the microphone at the match venue, the dropped windscreen not only hinders the progress of the game but also may cause a player to be injured due to slipping or the like. That is, the dropped windscreen may be a major hindrance to the game.

In the field where such a microphone is used, an adhesive is used for attaching the windscreen to the microphone in order to prevent the windscreen from dropping off from the microphone. As a result, the holding force of the windscreen with respect to the microphone increases. However, the ease of attaching and detaching the windscreen to and from the microphone decreases. That is, when an adhesive is used, the workability for attaching and detaching the windscreen to and from the microphone is reduced. In addition, after bonding, the windscreen cannot be detached from the microphone unless it is torn (unless it is broken), resulting in a single-use windscreen.

When an adhesive is used, the adhesive may interfere with a sound pickup portion of the microphone depending on an application amount of the adhesive and a position where the adhesive comes into contact with the microphone, resulting in deterioration of sound quality of the microphone.

SUMMARY

The present invention is directed to providing a microphone windscreen and a microphone device that are capable of facilitating attaching and detaching the windscreen to and from the microphone and preventing the windscreen from dropping off from the microphone.

A microphone windscreen according to the present invention includes a windscreen body that is detachably attached to a microphone, and an attachment/detachment member coupled to the windscreen body, in which the windscreen body includes an insertion cavity with one end opened in which the microphone is accommodated, the attachment/detachment member includes an insertion hole through which the microphone to be accommodated in the insertion cavity is placed, and a claw portion that is bendable and disposed at the insertion hole, in which the claw portion is located at a steady-state position without bending before the microphone is inserted through the insertion hole toward the insertion cavity, the claw portion is bent toward the insertion cavity by the microphone during the microphone being inserted through the insertion hole into the insertion cavity, and the claw portion returns to the steady-state position after the microphone is accommodated in the insertion cavity.

The present invention is able to facilitate attaching and detaching the windscreen to and from the microphone and prevent the windscreen from dropping off from the microphone.

DETAILED DESCRIPTION

Figure 1:
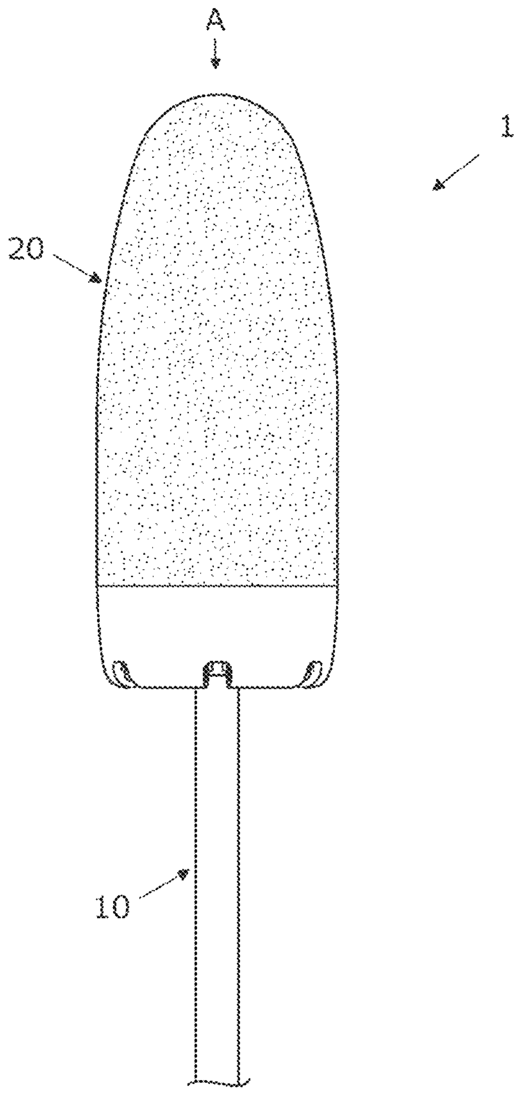
FIG. 1 is a front elevational view of a microphone device illustrating an embodiment of the microphone device according to the present invention.

Embodiments of a microphone device and a windscreen according to the present invention will be described below with referring to the drawings.

Microphone Device

Configuration of Microphone Device

FIG. 1 is a front elevational view of a microphone device illustrating an embodiment of the microphone device according to the present invention.

The microphone device 1 picks up a sound wave from a sound source (not illustrated) and outputs an electrical signal in response to the sound wave. The microphone device 1 includes a microphone 10 and a windscreen 20.

Figure 2:
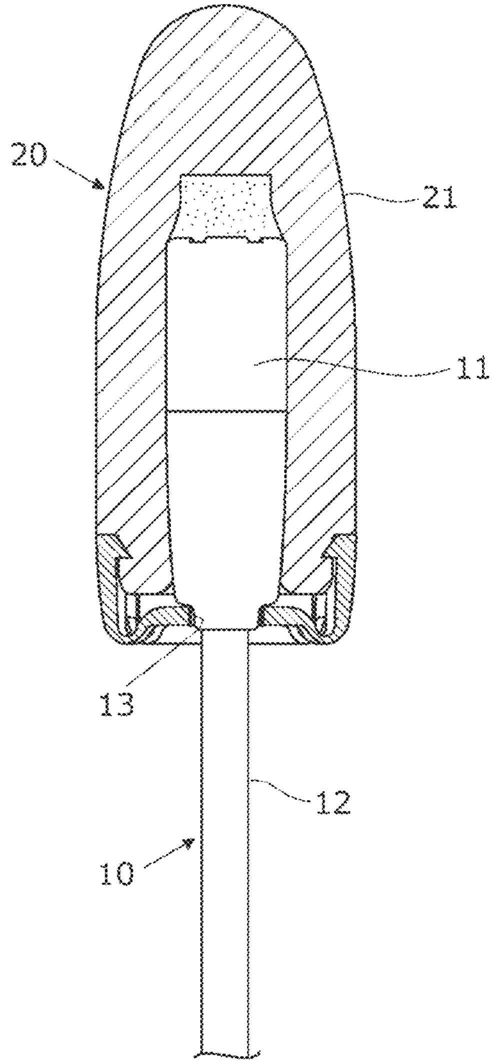
FIG. 2 is a longitudinal sectional view of the microphone device, the section taken along the direction indicated with the arrow A in FIG. 1.

FIG. 2 is a longitudinal sectional view of the microphone device 1, the section taken along the direction indicated with the arrow A in FIG. 1. The figure illustrates the microphone 10 in non section and the windscreen 20 in section (the same applies to FIGS. 7, 8, and 9 described later).

In the following description, the direction toward the upper side of the page of FIG. 2 is referred to as "upper direction", and the direction toward the lower side of the page of FIG. 2 is referred to as "lower direction". Similarly, the direction toward the left side of the page of FIG. 2 is referred to as "left direction", and the direction toward the right side of the page of FIG. 2 is referred to as "right direction".

Configuration of Microphone

The microphone 10 picks up a sound wave from a sound source and outputs an electrical signal in response to the sound wave. In the present embodiment, the microphone 10 is a lavalier microphone, for example. That is, for example, the microphone 10 may be worn on a person (a speaker or a player) in a TV program, a lecture meeting, a match venue of sports, and the like. The microphone 10 is worn on the collar and the chest of a user of the microphone 10 with a tie-pin clip (not illustrated), for example.

Note that, in the present invention, the microphone may be a narrow directional microphone such as a gun microphone.

The microphone 10 includes a microphone body 11, a cord 12, and a stepped portion 13.

The microphone body 11 is directed toward a sound source and picks up a sound wave from the sound source. The microphone body 11 has a hollow cylindrical shape with upper end closed. The microphone body 11 includes a microphone unit (not illustrated), a circuit board (not illustrated), and a sound wave inlet (not illustrated).

The microphone unit picks up a sound wave introduced from the sound wave inlet into the microphone body 11 and converts the sound wave into an electrical signal. The microphone unit is a condenser-type electroacoustic transducer, for example. The microphone unit is accommodated in the microphone body 11. The microphone unit, together with the microphone body 11, constitutes a sound pickup unit that picks up sounds.

Note that, the microphone unit is not limited to a condenser-type electroacoustic transducer in the present invention. That is, for example, the microphone unit may be a dynamic electroacoustic transducer.

The circuit board mounts thereon a circuit such as a balanced transmission circuit (not illustrated) that outputs sound signals from the microphone unit to an output connector (not illustrated). The circuit board is accommodated in the microphone body 11.

The sound wave inlet is an opening through which sound waves picked up by the microphone unit from a sound source pass. The sound wave inlet is disposed on an upper end surface of the microphone body 11.

The cord 12 connects the microphone 10 to a transmitter (not illustrated) as a receiver. The cord 12 outputs the sound signals from the circuit board via a signal line. The code 12 is disposed through the stepped portion 13. The transmitter is worn on a belt or near the waist of a user of the microphone 10, for example.

The stepped portion 13 prevents disconnection of the signal line due to bending at a lead-out portion of the cord 12 from the microphone body 11. That is, the stepped portion 13 functions as a so-called cord bush.

Configuration of Windscreen

Figure 3:
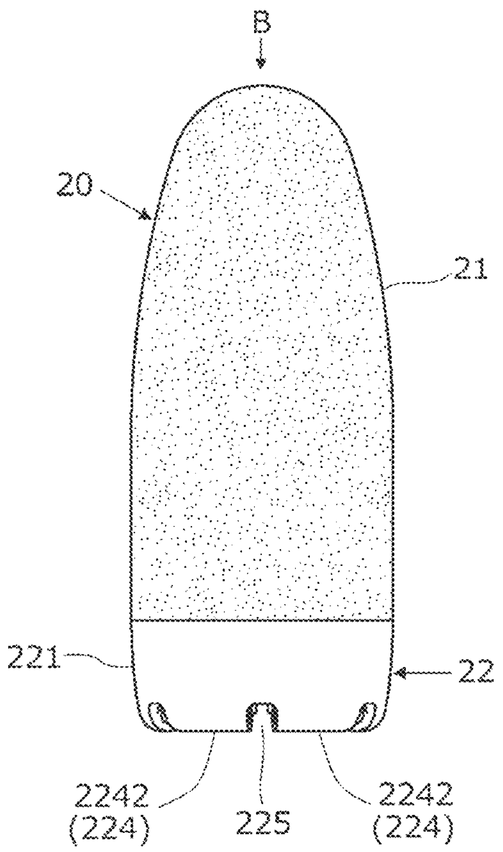
FIG. 3 is a front elevational view of a windscreen illustrating an embodiment of the windscreen according to the present invention included in the microphone device in FIG. 1.
Figure 4:
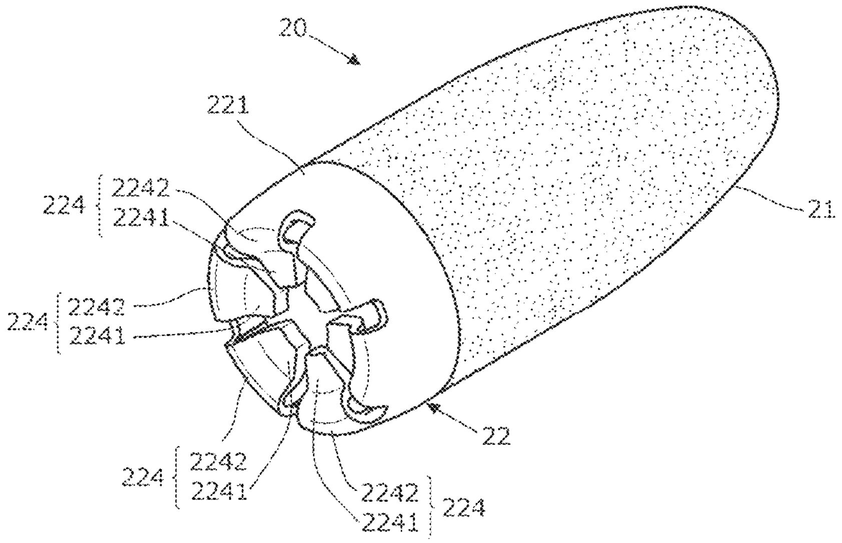
FIG. 4 is a perspective view of the windscreen in FIG. 3
Figure 5:
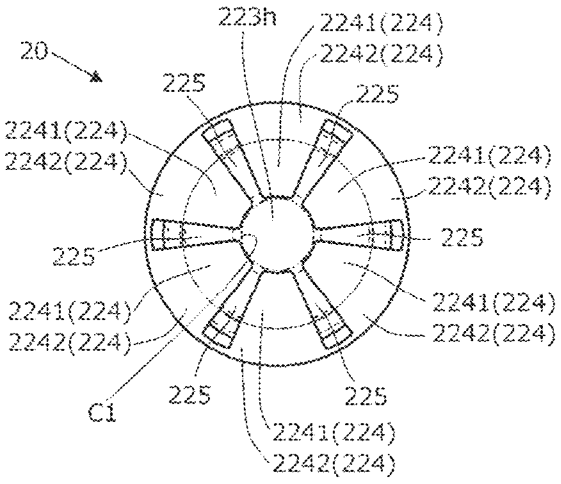
FIG. 5 is a bottom plan view of the windscreen in FIG. 3.
Figure 6:
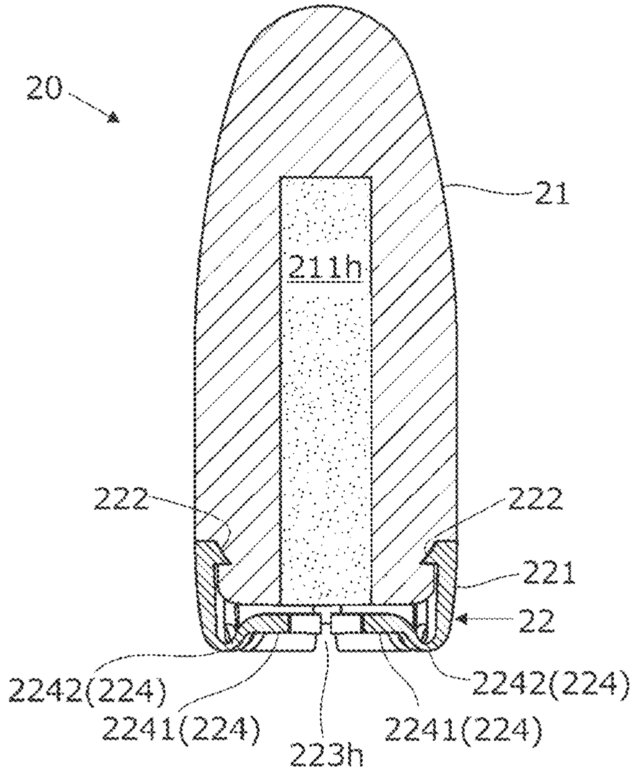
FIG. 6 is a longitudinal sectional view of the windscreen, the section taken along the direction indicated with the arrow B in FIG. 3.

FIG. 3 is a front elevational view of the windscreen 20 illustrating the embodiment of the windscreen 20 according to the present invention. FIG. 4 is a perspective view of the windscreen 20. FIG. 5 is a bottom plan view of the windscreen 20. FIG. 6 is a longitudinal sectional view of the windscreen 20, the section taken along the direction indicated with the arrow B in FIG. 3.

The windscreen 20 protects the sound pickup portion, thereby reducing the generation of wind noise caused by wind from outside of the microphone device 1 and the generation of so-called pop noise from the microphone unit due to breathing of a user of the microphone device 1. The windscreen 20 is detachably attached to the microphone 10. The windscreen 20 is an example of the "microphone windscreen" according to the present invention. The windscreen 20 includes a windscreen body 21 and an attachment/detachment member 22.

The windscreen body 21 is detachably attached to the microphone 10 by the attachment/detachment member 22. The windscreen body 21 covers the microphone body 11 and protects the sound pickup portion, thereby reducing the generation of wind noise due to breathing, wind from the outside of the microphone device 1, and the like. The windscreen body 21 is formed of a porous elastic material such as polyurethane, for example. The windscreen body 21 has a hollow cylindrical shape with upper end closed in which a rounded upper portion has substantially solid cylindrical shape and a lower end is opened. The lower end of the windscreen body 21 is located within a range in which a claw portion 224 of the attachment/detachment member 22 is bendable as described below. The windscreen body 21 includes an insertion cavity **211*h***.

The insertion cavity **211*h* accommodates the microphone body 11 inserted into the insertion cavity 211*h*. The insertion cavity 211*h* is a solid cylindrical-shaped cavity in which a lower end (one end) is opened and an upper end (the other end) is closed. The insertion cavity 211*h* is disposed inside the windscreen body 21. The opening portion of the insertion cavity 211*h* is disposed on the lower end surface of the windscreen body 21. The upper end surface (the closed surface) of the insertion cavity 211***h* is disposed above a center portion of the windscreen body 21 in the up-and-down direction.

The inner diameter of the insertion cavity 211*h* is smaller than the outer diameter of the microphone body 11. That is, when the microphone body 11 is inserted into the insertion cavity 211*h* and accommodated in the insertion cavity 211*h*, the inner diameter of the insertion cavity 211*h* is expanded to the same diameter as the outer diameter of the microphone body 11.

The outer diameter of the windscreen body 21 is configured to be reduced (smaller) from the substantially center portion toward an upper end portion in the up-and-down direction. That is, the outer diameter of the windscreen body 21 is tapered from the substantially center portion toward the upper end portion in the up-and-down direction. That is, the outer peripheral surface of the windscreen body 21 is inclined toward the center side in the radial direction of the windscreen body 21 from the substantially center portion toward the upper end portion in the up-and-down direction.

Note that, in the present invention, the shape of the windscreen body is not limited to the shape in the present embodiment. That is, the outer peripheral surface of the windscreen body may be a solid cylindrical shape without incline, for example.

The attachment/detachment member 22 facilitates attaching and detaching of the windscreen 20 to and from the microphone 10. The attachment/detachment member 22 is made of a thermoplastic elastomer resin, for example, and is formed of an elastic member having elasticity. The attachment/detachment member 22 covers an outer periphery of a lower end portion (one end portion) of the windscreen body 21 and is coupled to (fixed to) the lower end portion of the windscreen body 21. The attachment/detachment member 22 is coupled to the windscreen body 21 with an adhesive (not illustrated), for example. The attachment/detachment member 22 is gripped by a user when the windscreen 20 is attached to and detached from the microphone 10.

When the attachment/detachment member 22 is coupled to the windscreen body 21, the outer peripheral surface of the attachment/detachment member 22 is contiguous to the outer peripheral surface of the windscreen body 21 in the up-and-down direction. In other words, the attachment/detachment member 22 includes the contiguous outer peripheral surface to the outer peripheral surface of the windscreen body 21 in the up-and-down direction.

The attachment/detachment member 22 includes a grip portion 221, an engagement claw 222, an insertion hole 223*h*, a claw portion 224, and a notch groove 225.

The grip portion 221 is gripped by a user when the windscreen 20 is attached to and detached from the microphone 10. The grip portion 221 has a ring shape. The grip portion 221 covers the outer periphery of the lower end portion of the windscreen body 21. The grip portion 221 functions as a side wall of the attachment/detachment member 22. That is, the grip portion 221 is an example of the a "side wall portion" in the present invention.

The grip portion 221 may be deformed in an elliptical ring shape by a force for gripping the grip portion 221 when the grip portion 221 is gripped by a user. The deformed grip portion 221 is restored to its original shape by the elastic force when the user releases the force for griping the grip portion 221.

The engagement claw 222 is disposed at the upper end of the grip portion 221 and projects inward (toward inside) from the grip portion 221. The engagement claw 222 includes six engagement claws 222 (only two engagement claws are illustrated in FIG. 6). The engagement claws 222 are disposed at predetermined intervals in the circumferential direction of the grip portion 221.

In the present embodiment, each engagement claw 222 has the same configuration. In the following description, the engagement claws 222 are all denoted by the same reference signs "222" and collectively referred to as "engagement claw 222".

When the attachment/detachment member 22 is coupled to the windscreen body 21, the engagement claw 222 digs into the outer peripheral surface of the lower portion of the windscreen body 21. Accordingly, the windscreen body 21 and the attachment/detachment member 22 that are coupled with an adhesive are more tightly coupled.

Note that, in the present invention, the number of engagement claws is not limited to "six", that is, for example, the number of engagement claws may be "one" or a plurality of claws other than "six".

The insertion hole 223*h* is a hole through which the microphone body 11 is placed. The insertion hole 223*h* is an opening defined by the inner peripheral surface of the grip portion 221.

The claw portion 224 is integrally formed with the grip portion 221 and is connected to the lower end of the grip portion 221. The claw portion 224 is located under the opening portion of the insertion cavity 211*h*. In the present embodiment, the attachment/detachment member 22 includes the six claw portions 224. The claw portions 224 are disposed at equal intervals with a predetermined distance in the circular circumferential direction of the grip portion 221.

In the present embodiment, each claw portion 224 has the same configuration. In the following description, the claw portions 224 are all denoted by the same reference signs "224" and collectively referred to as "claw portion 224".

The claw portion 224 includes a bent portion 2241 and a connecting portion 2242. The half of the claw portion 224 on the side of the grip portion 221 is folded back to the inside of the grip portion 221 in such a way as to be a U shape being convex downward in the longitudinal sectional view, which constitutes the connecting portion 2242. That is, the connecting portion 2242 has a U shape in the longitudinal sectional view.

The remaining half of the claw portion 224 is disposed along the right-and-left direction and constitutes a bent portion 2241. That is, the bent portion 2241 projects from the connecting portion 2242 toward the inner side in the radial direction of the grip portion 221 and is cantilevered by the connecting portion 2242. In other words, the claw portion 224 projects inward from the lower end (one end) of the grip portion 221.

One end of the connecting portion 2242 is connected to the grip portion 221, and the other end of the connecting portion 2242 is bent to the inside of the insertion hole 223*h* and connected to the bent portion 2241. That is, the connecting portion 2242 connects between the grip portion 221 and the bent portion 2241. Herein, when the bent portion 2241 is disposed along the right-and-left direction, the claw portion 224 is located at a "steady-state position" in the present invention. In other words, the claw portion 224 is located at the steady-state position without bending before the microphone body 11 is inserted through the insertion hole 223*h* toward the insertion cavity 211*h*, i.e., before the windscreen 20 is attached to the microphone 10. The bent portion 2241 is disposed under the opening portion of the insertion cavity 211*h* in the insertion hole 223*h*. The distance from the connecting portion 2242 to a tip of the bent portion 2241 is longer than the distance from the connecting portion 2242 to the opening portion of the insertion cavity 211*h*. The claw portion 224 configured in this way is disposed at the insertion hole 223*h* except for a part of the connecting portion 2242.

In the view from the lower direction, the diameter of a virtual circle C1 (see FIG. 5) defined by connecting the tips of the bent portions 2241 (the radially inner end portions of the grip portion 221) is smaller than the outer diameter of the microphone body 11, slightly larger than the outer diameter of the stepped portion 13, and larger than the outer diameter of the cord 12. In the view from the bottom, the virtual circle C1, the insertion hole 223*h*, and the insertion cavity 211*h* are disposed concentrically.

The claw portion 224 has elasticity and is bendable. Thus, when the windscreen 20 is put on (attached to) the microphone 10, the claw portion 224 is bent upward from the steady-state position. Specifically, the bent portion 2241 is bent in such a way as to rise upward starting from the connected point with the connecting portion 2242. In this state, the tip of the bent portion 2241 is pushed into the insertion cavity 211*h* in such a way as to push and expand the insertion cavity 211*h*. In other words, the claw portion 224 is bent toward the insertion cavity 211*h* while the microphone body 11 (a part of the microphone body 11) is being inserted through the insertion hole 223*h* into the insertion cavity 211*h*, i.e., while the windscreen 20 is being attached to the microphone 10 (during the operation of attaching). When the microphone body 11 is completely accommodated in the insertion cavity 211*h*, i.e., when the microphone body 11 finishes passing by the claw portion 224, the claw portion 224 returns to the original state (the steady-state position) due to the own elastic force. In other words, the claw portion 224 returns to the steady-state position after the microphone body 11 is accommodated in the insertion cavity 211*h*. Specifically, the bent portion 2241 falls inward in the radial direction of the grip portion 221 starting from the connected point with the connecting portion 2242 and is disposed along the right-and-left direction.

In contrast, when the windscreen 20 is detached (removed) from the microphone 10, the claw portion 224 is bent downward from the steady-state position. Specifically, the bent portion 2241 is bent downward starting from the connected point with the connecting portion 2242. In other words, while the windscreen 20 is being detached from the microphone 10, i.e., when the microphone body 11 is on the way to be pulled out through the insertion hole 223*h*, the claw portion 224 is bent toward the opposite side to the insertion cavity 211*h*. When the windscreen 20 finishes being detached from the microphone 10, i.e., when the detachment is completed, the claw portion 224 returns to the original state (the steady-state position) due to the own elastic force. Specifically, the bent portion 2241 jumps up inwardly in the radial direction of the grip portion 221 starting from the connected point with the connecting portion 2242 and is disposed along the right-and-left direction.

The connecting portion 2242 is formed in the U shape in the claw portion 224 to be bent in this way, and thus stress applied to the claw portion 224 when the bent portion 2241 is bent is dispersed by the connecting portion 2242. The connecting portion 2242 is formed in the U shape, and thus the connecting portion 2242 has a so-called hemming structure and the strength of the claw portion 224 increases. The connecting portion 2242 is formed in the U shape, and thus the connected position of the bent portion 2241 to the connecting portion 2242 is above the lower portion (the bottom portion) of the connecting portion 2242 in the up-and-down direction. That is, in the lower portion of the attachment/detachment member 22 (the claw portion 224), a concave space is defined from the lower portion (the bottom portion) of the connecting portion 2242 to the position of the bent portion 2241. Thus, when the windscreen 20 is attached to the microphone 10, the bent portion 2241 disposed in the space serves as a guide for alignment for inserting the microphone body 11 into the center of the insert hole 211*h*.

Note that, in the present invention, the number of claw portions is not limited to "six", that is, the number of claw portions may be "one" or a plurality of claw portions other than "six", for example.

The notch groove 225 is disposed between each of the claw portions 224. That is, the number of notch grooves 225 is "six", for example. The notch grooves 225 are disposed radially at the lower portion of the attachment/detachment member 22. A part of the notch groove 225 is disposed at the grip portion 221.

Attaching and Detaching Windscreen

Next, attaching and detaching the windscreen, that is, the "attaching the windscreen 20 to the microphone 10" in which the windscreen 20 is attached to the microphone 10, and the "detaching the windscreen 20 from the microphone 10" in which the windscreen 20 is detached from the microphone 10 will be described.

Attaching Windscreen 20 to Microphone 10

Figure 7:
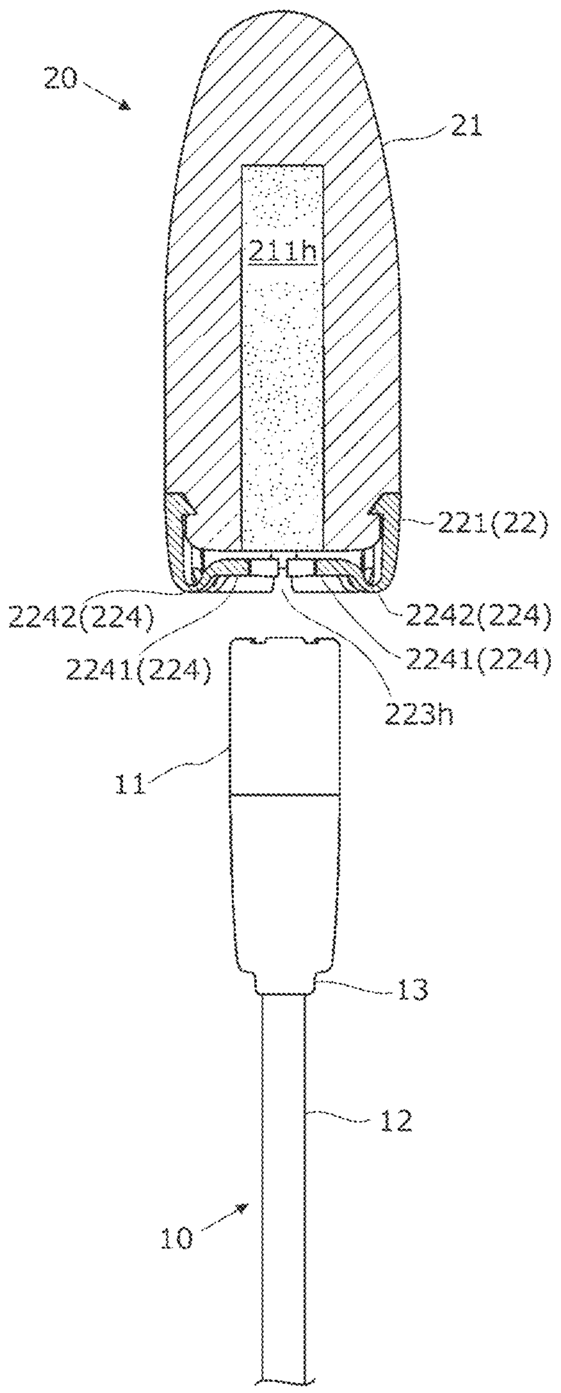
FIG. 7 is an exploded longitudinal sectional view of the microphone device in FIG. 1 illustrating a state before the microphone included in the microphone device in FIG. 1 is inserted into the windscreen in FIG. 3.

FIG. 7 is an exploded view of the microphone device 1 illustrating a state before the microphone 10 is inserted into the windscreen 20.

When the windscreen 20 is attached to the microphone body 11, a user grips the grip portion 221 and the microphone body 11 or the cord 12, and the user brings the microphone body 11 and the windscreen 20 close to each other. Before the microphone body 11 is inserted through the insertion hole 223*h* toward the insertion cavity 211*h*, the claw portion 224 is located at the steady-state position without bending.

First, the microphone body 11 is inserted through the insertion hole 223*h* from the upper end side of the microphone body 11.

In this state, the upper end portion of the microphone body 11 abuts on the claw portion 224 located at the steady-state position. Then, when the microphone body 11 is pushed toward the insertion cavity 211*h*, the bent portion 2241 (the claw portion 224) abuts on the outer peripheral surface of the microphone body 11, and the bent portion 2241 is bent upward (toward the insertion cavity 211*h*) from the steady-state position. The tip of the bent portion 2241 pushes and expands the opening end of the windscreen body 21 (the opening end of the insertion cavity 211*h*). That is, the lower end portion (the opening end) of the insertion cavity 211*h* of the windscreen body 21 is expanded in diameter by the claw portion 224 while the microphone body 11 is being inserted through the insertion hole 223*h* into the insertion cavity 211*h*. Thus, the microphone body 11 is being inserted into the insertion cavity 211*h* so as to slide on the bent portion 2241, and the bent portion 2241 functions as a guide. As a result, the microphone body 11 is easily inserted into the insertion cavity 211*h*.

Figure 8:
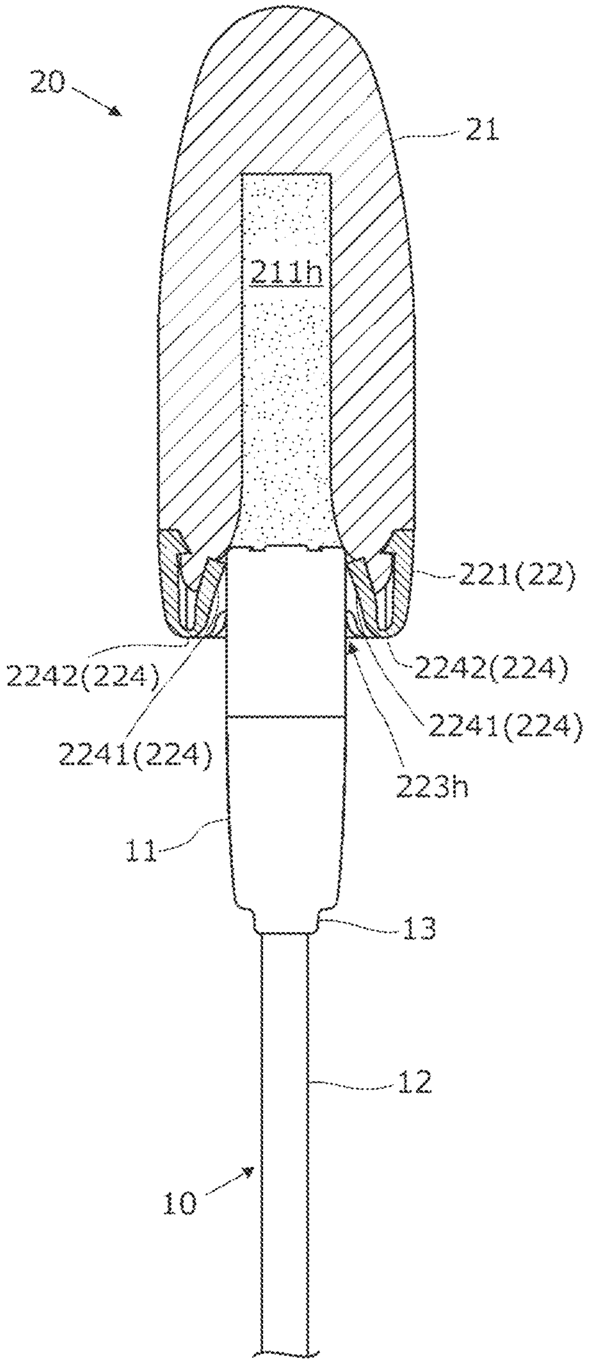
FIG. 8 is a longitudinal sectional view of the microphone device illustrating a state during the microphone in FIG. 7 being inserted into the windscreen in FIG. 3.

FIG. 8 is a longitudinal sectional view of the microphone device 1 illustrating a state while the microphone 10 is being inserted into the windscreen 20. The figure illustrates a state in which the windscreen 20 is being attached to the microphone 10 (during the operation of attaching).

The microphone body 11 continues to be inserted (pushed) through the insertion hole 223*h* toward the insertion cavity 211*h*. While the microphone body 11 is being inserted through the insertion hole 223*h* into the insertion cavity 211*h*, the bent portion 2241 (the claw portion 224) is bent upward (toward the insertion cavity 211*h*) from the steady-state position with abutting on the outer peripheral surface of the microphone body 11. The microphone body 11 is being inserted into the insertion cavity 211*h* while expanding the diameter of the insertion cavity 211*h*.

Figure 9:
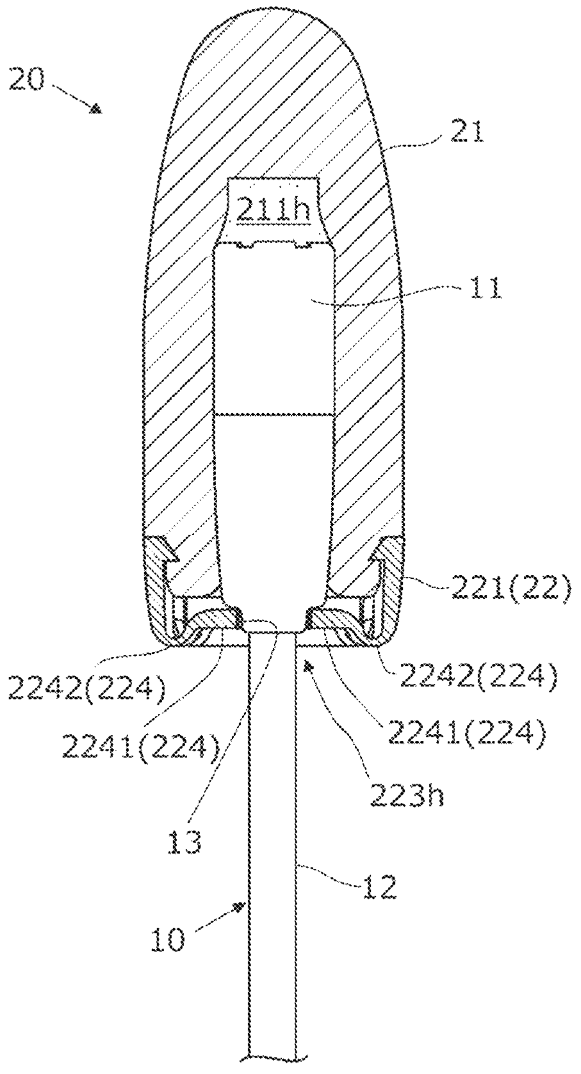
FIG. 9 is a longitudinal sectional view of the microphone device illustrating a state after the microphone in FIG. 7 is placed into the windscreen in FIG. 3.

FIG. 9 is a longitudinal sectional view of the microphone device 1 illustrating a state after the microphone 10 is placed into the windscreen 20. The figure illustrates the state when the microphone body 11 is completely accommodated in the insertion cavity 211*h*, i.e., when the microphone body 11 finishes passing by the claw portion 224.

When the microphone body 11 is completely placed (accommodated) in the insertion cavity 211*h*, i.e., when the microphone body 11 finishes passing by the claw portion 224, the claw portion 224 returns to the original state (the steady-state position) due to the own elastic force. That is, the state in which the bent portion 2241 (the claw portion 224) abuts on the outer peripheral surface of the microphone body 11 is released. In other words, the bent portion 2241 (the claw portion 224) returns to the steady-state position after the microphone body 11 is placed (accommodated) in the insertion cavity 211*h*. In this state, the bent portion 2241 (the claw portion 224) returns with momentum to the steady-state position due to the elastic force. As a result, a user can identify that attaching the windscreen 20 to the microphone 10 is completed by feeling a sense (click feeling) in which the bent portion 2241 (the claw portion 224) has returned to the steady-state position.

When the claw portion 224 returns to the steady-state position, the microphone body 11 is slightly pushed back downward by the elastic force of the windscreen body 21. As a result, the stepped portion 13 of the microphone 10 is disposed in the virtual circle C1. As described above, the diameter of the virtual circle C1 is smaller than the outer diameter (the diameter) of the microphone body 11. Accordingly, the bent portion 2241 (the claw portion 224) is disposed in such a way as to project under the microphone body 11. As a result, the claw portion 224 serves as a holder for the microphone body 11. Thus, the windscreen 20 is not easily dropped off from the microphone 10.

The windscreen 20 is attached to the microphone 10 in this way. In this state, the microphone body 11 is tightened by the windscreen body 21 due to the elastic force of the windscreen body 21. As a result, the windscreen 20 is fixed to the microphone 10 by a tightening force with respect to the microphone 10 and a frictional force generated between the windscreen 20 and the microphone 10 (hereinafter collectively referred to as "holding force"). As described above, the claw portion 224 serves as a holder for the microphone body 11, and thus, the windscreen 20 is not easily dropped off from the microphone 10 due to the claw portion 224 even though the holding force deteriorates due to the aged degradation of the windscreen body 21. That is, the windscreen 20 is prevented from dropping off from the microphone 10.

Detaching Windscreen 20 from Microphone 10

When the windscreen 20 is detached from the microphone body 11, a user grips the grip portion 221 and the cord 12 and moves the microphone 10 downward from the windscreen 20, i.e., pulls out the microphone 10 from the windscreen 20.

In this case, first, the lower end portion of the microphone body 11 abuts on the claw portion 224 located at the steady-state position. Then, the microphone body 11 is pulled out from the insertion cavity 211*h* (downward), and the bent portion 2241 (the claw portion 224) is bent downward (toward the opposite side to the insertion cavity 211*h*) from the steady-state position.

The microphone body 11 continues to be pulled out from the insertion cavity 211*h* (downward). While the microphone body 11 is being pulled out from the insertion cavity 211*h* (downward), the bent portion 2241 (the claw portion 224) is bent downward (toward the opposite side to the insertion cavity 211*h*) from the steady-state position with abutting on the outer peripheral surface of the microphone body 11.

The microphone body 11 is further pulled out from the insertion cavity 211*h* (downward) and thus is completely pulled out from the insertion cavity 211*h* and the insertion hole 223*h*. When the microphone body 11 is completely pulled out from the insertion hole 223*h*, i.e., when the microphone body 11 finishes passing by the claw portion 224, the claw portion 224 returns to the original state (the steady-state position) due to the own elastic force. That is, the state in which the bent portion 2241 (the claw portion 224) abuts on the outer peripheral surface of the microphone body 11 is released. In other words, the bent portion 2241 (the claw portion 224) returns to the steady-state position after the microphone body 11 is completely pulled out from the insertion hole 223*h*. In this state, the bent portion 2241 (the claw portion 224) returns with momentum to the steady-state position due to the elastic force. As a result, a user can identify that detaching the windscreen 20 from the microphone 10 is completed by feeling a sense (click feeling) in which the bent portion 2241 (the claw portion 224) has returned to the steady-state position.

In this way, when the windscreen 20 is detached from the microphone body 11, a user grips the grip portion 221 and the cord 12. That is, when the windscreen 20 is detached from the microphone body 11, the windscreen body 21 is not pulled. Thus, the windscreen body 21 is not torn (not broken). When the windscreen 20 is detached from the microphone body 11, the bent portion 2241 (the claw portion 224) is bent toward the opposite side to the insertion cavity 211*h* with abutting on the outer peripheral surface of the microphone body 11. Thus, a user can detach the windscreen 20 from the microphone body 11 without using excessive force.

According to the embodiment described above, the attachment/detachment member 22 coupled to the windscreen body 21 includes the insertion hole 223*h* and the claw portion 224. Before the microphone 10 (the microphone body 11) is inserted through the insertion hole 223*h* toward the insertion cavity 211*h*, the claw portion 224 is located at the steady-state position without bending. The claw portion 224 is bent upward (toward the insertion cavity 211*h*) from the steady-state position while the microphone 10 (the microphone body 11) is being inserted through the insertion hole 223*h* into the insertion cavity 211*h*. Thus, the microphone 10 is being inserted into the insertion cavity 211*h* so as to slide on the claw portion 224 (the bent portion 2241), and the claw portion 224 functions as a guide. As a result, the windscreen 20 is easily attached to the microphone 10. The claw portion 224 returns to the steady-state position when the microphone body 11 is completely placed (accommodated) in the insertion cavity 211*h*, i.e., after the microphone 10 is accommodated in the insertion cavity 211*h*. As a result, a user can identify that attaching the windscreen 20 to the microphone 10 is completed by feeling a sense (click feeling) in which the bent portion 2241 (the claw portion 224) has returned to the steady-state position. The claw portion 224 returned to the steady-state position is disposed so as to project under the microphone body 11, and thus the claw portion 224 serves as a holder for the microphone body 11. As a result, the windscreen 20 is not easily dropped off the microphone 10 due to the claw portion 224 even though the holding force deteriorates due to the aged degradation of the windscreen body 21. That is, the windscreen 20 is prevented from dropping off from the microphone 10 in a match venue of sports and the like.

According to the embodiment describe above, the claw portion 224 is bent with abutting on the outer peripheral surface of the microphone 10 while the microphone 10 is being inserted through the insertion hole 223*h* into the insertion cavity 211*h*. Thus, the microphone body 11 is being inserted into the insertion cavity 211*h* so as to slide on the bent portion 2241, and the bent portion 2241 functions as a guide. As a result, the windscreen 20 is easily attached to the microphone 10 as described above.

According to the embodiment described above, the claw portion 224 is bent toward the opposite side to the insertion cavity 211*h* while the microphone 10 is being pulled out through the insertion hole 223*h*. The claw portion 224 returns to the steady-state position after the microphone 10 is completely pulled out from the insertion hole 223*h*. Thus, a user can identify that detaching the windscreen 20 from the microphone 10 is completed by feeling a sense (click feeling) in which the bent portion 2241 (the claw portion 224) has returned to the steady-state position. The claw portion 224 abuts on the outer peripheral surface of the microphone 10 while the microphone 10 is being pulled out through the insertion hole 223*h*. Thus, a user can detach the windscreen 20 from the microphone body 11 without using excessive force.

According to the embodiment described above, the attachment/detachment member 22 includes the grip portion 221, and the claw portion 224 projects inward from the one end (the lower end) of the grip portion 221. Thus, as described above, the claw portion 224 returned to the steady-state position is located under the lower end of the microphone body 11, and thus the windscreen 20 is not easily dropped off from the microphone 10. That is, the windscreen 20 is prevented from dropping off from the microphone 10 in a match venue of sports and the like.

According to the embodiment described above, the claw portion 224 expands in diameter the opening end portion of the insertion cavity 211*h* while the microphone 10 is being inserted through the insertion hole 223*h* into the insertion cavity 211*h*. Thus, when the windscreen 20 is attached to the microphone 10, a user does not have to expand the opening of the windscreen body 21 (the insertion cavity 211*h*) by the own hands. As a result, the windscreen 20 is easily attached to the microphone 10, and the workability for attaching the windscreen 20 to the microphone 10 is increased. A user does not expand the opening of the windscreen 20 by the own hands, and thus the risk of the windscreen body 21 being broken is reduced.

According to the embodiment described above, the claw portion 224 includes the bent portion 2241 and the connecting portion 2242. The connecting portion 2242 has a U shape in a longitudinal sectional view, one end of the connecting portion 2242 is connected to the grip portion 221, and the other end of the connecting portion 2242 is bent toward the insertion hole 223*h* and connected to the bent portion 2241. The connecting portion 2242 has the U shape, and thus the stress applied on the claw portion 224 when the bent portion 2241 is bent is dispersed. The connecting portion 2242 is formed in the U shape, and thus the connecting portion 2242 has a so-called hemming structure and the strength of the claw portion 224 increases. The connecting portion 2242 is formed in the U shape, and thus the connected position of the bent portion 2241 to the connecting portion 2242 is above the lower portion (the bottom portion) of the connecting portion 2242 in the up-and-down direction. That is, in the lower portion of the attachment/detachment member 22 (the claw portion 224), a concave space is defined from the lower portion (the bottom portion) of the connecting portion 2242 to the position of the bent portion 2241. Thus, when the windscreen 20 is attached to the microphone 10, the bent portion 2241 disposed in the space serves as a guide for alignment for inserting the microphone body 11 into the center of the insertion cavity 211*h*.

Note that the configuration in which the windscreen 20 is attached to the microphone 10 is described in the embodiment described above. Alternatively, the windscreen according to the present invention may be attached to other microphones. That is, the windscreen according to the present invention is applicable to other types and shapes of microphones.

Figure 10:
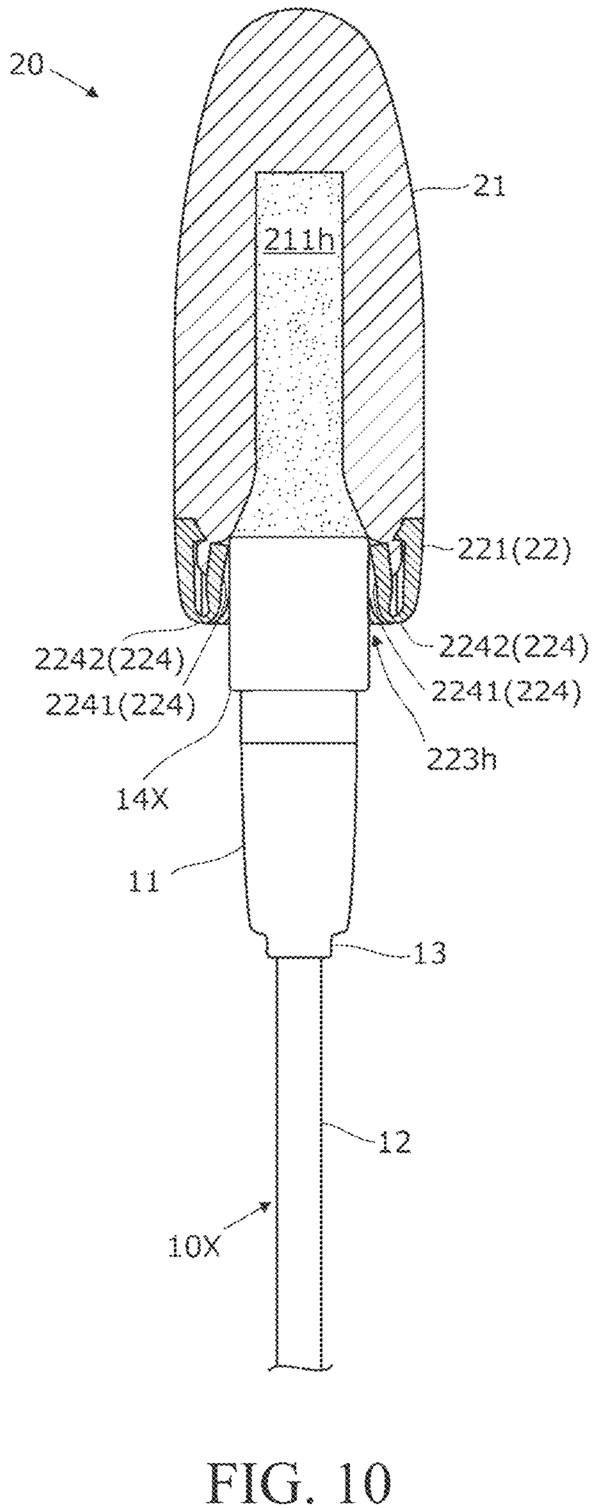
FIG. 10 is a longitudinal sectional view of the microphone device illustrating a state during another microphone being inserted into the windscreen in FIG. 3.

FIG. 10 is a longitudinal sectional view of the microphone device illustrating a state during another microphone being inserted into the windscreen according to the present invention. The figure illustrates the state in which the windscreen 20 is being attached to the microphone 10*x* (during the operation of attaching). The figure illustrates the microphone 10X in non section and the windscreen 20 in section.

The configuration of the microphone 10X is the same as the configuration of the microphone 10 in the embodiment described above, except that the microphone 10X includes an acoustic adjustment member 14X. That is, the microphone 10X includes the microphone body 11, a microphone unit (not illustrated), a circuit board (not illustrated), the cord 12, the stepped portion 13, and the acoustic adjustment member 14X. Except for the acoustic adjustment member 14X, components in common with the microphone 10 are denoted with the same reference signs, and the description thereof will be omitted.

The acoustic adjustment member 14X adjusts the sound of the microphone 10X. The acoustic adjustment member 14X is attached to the upper portion of the microphone body 11. The outer diameter of the acoustic adjustment member 14X is larger than the outer diameter of the microphone body 11.

Even in the case where the windscreen 20 is attached to the microphone 10X, the bent portion 2241 (the claw portion 224) of the windscreen 20 is bent toward the insertion cavity 211*h* to fit the outer diameter of the microphone 10X. That is, when the microphone body 11 is pushed toward the insertion cavity 211*h*, the bent portion 2241 (the claw portion 224) is bent toward the insertion cavity 211*h*. The bent portion 2241 in the bent state pushes and expands the opening end of the windscreen body 21 (the opening end of the insertion cavity 211*h*). That is, the lower end portion (the opening end portion) of the insertion cavity 211*h* of the windscreen body 21 is expanded in diameter to fit the outer diameter of the microphone body 11. As a result, the microphone body 11 is easily inserted into the insertion cavity 211*h*.

In this way, the windscreen according to the present invention is applicable to microphones having different shapes. That is, it is no longer necessary to have a dedicated windscreen for each type and size of a microphone. As a result, the windscreen according to the present invention may be reused for another shape of a microphone after being used for a certain shape of a microphone.

REFERENCE SIGNS LIST

1 Microphone device
10, 10X Microphone
11 Microphone body
12 Code
20 Windscreen
21 Windscreen body
211*h* Insertion cavity
22 Attachment/detachment member
221 Grip portion
222 Engagement claw
223*h* Insertion hole
224 Claw portion
2241 Bent portion
2242 Connecting portion

The invention claimed is:

1. A microphone windscreen comprising:

a windscreen body detachably attachable to a microphone; and an attachment/detachment member having elasticity and configured to be coupled to the windscreen body, wherein the windscreen body includes an insertion cavity with one end opened, the insertion cavity configured to accommodate the microphone, and the attachment/detachment member includes an insertion hole through which the microphone accommodated in the insertion cavity is placed and a claw portion configured to be bendable and disposed at the insertion hole, wherein the claw portion is configured to be located under an opening of the insertion cavity, the claw portion is configured to be located at a steady-state position without bending before the microphone is inserted through the insertion hole toward the insertion cavity, the claw portion is configured to be bent toward the insertion cavity by the microphone with abutting on an outer peripheral surface of the microphone in such a way as to guide the microphone to the insertion cavity and configured to expand in diameter an opening end portion of the insertion cavity while the microphone is being inserted through the insertion hole into the insertion cavity, and the claw portion is configured to return to the steady-state position after the microphone is accommodated in the insertion cavity.

2. The microphone windscreen according to claim 1, wherein the claw portion is configured to be bent toward an opposite side to the insertion cavity while the microphone is being pulled out through the insertion hole, and the claw portion is configured to return to the steady-state position after the microphone is completely pulled out from the insertion hole.

3. The microphone windscreen according to claim 2, wherein the claw portion abuts on the outer peripheral surface of the microphone while the microphone is being pulled out through the insertion hole.

4. The microphone windscreen according to claim 1, wherein the windscreen body has a hollow cylindrical shape with upper end closed and lower end opened, the attachment/detachment member is configured to be coupled to a lower end portion of the windscreen body and includes a side wall portion that covers the lower end portion of the windscreen body, and the claw portion projects inward from one end of the side wall portion.

5. The microphone windscreen according to claim 4, wherein the claw portion includes a bent portion configured to be bent toward the insertion cavity, and a connecting portion configured to connect between the side wall portion and the bent portion, wherein the connecting portion has a U shape in a longitudinal sectional view, one end of the connecting portion is connected to the side wall portion, and another end of the connecting portion is bent toward the insertion hole and connected to the bent portion.

6. A microphone device comprising:

a microphone; and a microphone windscreen configured to be attached to the microphone, wherein the microphone windscreen is the microphone windscreen according to claim 1.

* * * * *